United States Patent
Kokojima et al.

(10) Patent No.: US 9,626,784 B2
(45) Date of Patent: Apr. 18, 2017

(54) IMAGE DISPLAY SYSTEM, DISPLAY DEVICE, AND IMAGE PROCESSING METHOD

(71) Applicant: KABUSHIKI KAISHA TOSHIBA, Minato-ku, Tokyo (JP)

(72) Inventors: Yoshiyuki Kokojima, Kanagawa (JP); Masahiro Baba, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 64 days.

(21) Appl. No.: 14/635,008

(22) Filed: Mar. 2, 2015

(65) Prior Publication Data

US 2015/0325020 A1 Nov. 12, 2015

(30) Foreign Application Priority Data

May 9, 2014 (JP) ................................. 2014-098081

(51) Int. Cl.
| | |
|---|---|
| *G06T 11/60* | (2006.01) |
| *G06F 3/14* | (2006.01) |
| *H04N 9/31* | (2006.01) |
| *G09G 5/26* | (2006.01) |
| *G06F 3/0485* | (2013.01) |

(52) U.S. Cl.
CPC ............ *G06T 11/60* (2013.01); *G06F 3/0485* (2013.01); *G06F 3/1423* (2013.01); *G09G 5/26* (2013.01); *H04N 9/3188* (2013.01); *G09G 2340/145* (2013.01)

(58) Field of Classification Search
None
See application file for complete search history.

(56) References Cited

U.S. PATENT DOCUMENTS

| | | |
|---|---|---|
| 2002/0101537 A1 | 8/2002 | Basson et al. |
| 2006/0236238 A1 | 10/2006 | Yoshikawa |
| 2010/0253862 A1 | 10/2010 | Takahashi |
| 2011/0050727 A1 | 3/2011 | Mukawa |

(Continued)

FOREIGN PATENT DOCUMENTS

| | | |
|---|---|---|
| EP | 2 610 738 A2 | 7/2013 |
| JP | 2002-018158 | 1/2002 |
| JP | 2002018158 A * | 1/2002 |

(Continued)

OTHER PUBLICATIONS

Japanese Office Action for Japanese Patent Application No. 2014-098081 mailed on Jan. 5, 2016.

(Continued)

*Primary Examiner* — Kee M Tung
*Assistant Examiner* — Yi Wang
(74) *Attorney, Agent, or Firm* — Amin, Turocy & Watson LLP

(57) ABSTRACT

According to an embodiment, an image display system includes a first generator and a second generator. The first generator generates a first image which includes first text data representing at least a portion of text data and which is displayed by a first display device of stationary type. The second generator generates a second image which includes second text data representing at least a portion of the first text data and which is displayed by a second display device that is worn by a first user.

15 Claims, 11 Drawing Sheets

THIRD IMAGE

FIRST IMAGE
INFORMATION INDICATING RANGE EQUIVALENT TO SECOND TEXT DATA

FOURTH IMAGE

FIRST IMAGE
SECOND IMAGE IN REDUCED FORM

(56) References Cited

U.S. PATENT DOCUMENTS

2012/0218125 A1*  8/2012  Demirdjian ............ G08G 1/164
                                                 340/905
2013/0167070 A1   6/2013  Tsuda et al.

FOREIGN PATENT DOCUMENTS

| JP | 2002-165156 | 6/2002 |
|----|-------------|--------|
| JP | 2004-163840 | 6/2004 |
| JP | 2010-151997 | 7/2010 |
| JP | 2010-237522 | 10/2010 |
| JP | 5262688 | 8/2013 |
| JP | 2014-071663 | 4/2014 |
| WO | 2010/067365 A2 | 6/2010 |
| WO | 2013/128612 | 9/2013 |

OTHER PUBLICATIONS

Extended European Search Report for European Patent Application No. 15157379.7 mailed Sep. 18, 2015, 17 pages.
Partial European Search Report for European Patent Application No. 15157379.7 mailed May 26, 2015, 8 pages.
Japanese Office Action for Japanese Patent Application No. 2014-098081 mailed on Aug. 9, 2016. Translated to English by JPO Global Dossier on Aug. 26, 2016. Dictionary last updated Jul. 24, 2016.

* cited by examiner

FIRST TEXT DATA → FIRST IMAGE

FIRST TEXT DATA → SECOND TEXT DATA

FIRST IMAGE

INFORMATION INDICATING RANGE EQUIVALENT TO SECOND TEXT DATA

THIRD IMAGE

FIRST IMAGE

SECOND IMAGE IN REDUCED FORM

FOURTH IMAGE

IMAGE DISPLAY SYSTEM, DISPLAY DEVICE, AND IMAGE PROCESSING METHOD

CROSS-REFERENCE TO RELATED APPLICATIONS

This application is based upon and claims the benefit of priority from Japanese Patent Application No. 2014-098081, filed on May 9, 2014; the entire contents of which are incorporated herein by reference.

FIELD

Embodiments described herein relate generally to an image display system, a display device, and an image processing method.

BACKGROUND

A system called prompter is known in which scripts or lyrics are electronically displayed during television broadcasting, concerts, or speeches. The prompter can be broadly divided into three types, namely, a prompter used in television broadcasting, a prompter used in concerts, and a prompter used in speeches. As a prompter used in speeches, images of the script of the speech are displayed on a liquid crystal display that is installed in front of or above a podium, and the light including information about the images of the script is reflected using a stand-type half mirror and is transmitted to the speaker. That enables the speaker to visually confirm the script while keeping his or her face lifted. Hence, it becomes possible to give an eloquent speech while looking at the audience. As scrolling of the script or turning the pages of the script, a dedicated operator operates a personal computer (PC) which has dedicated software installed therein and which is placed at a distance from the podium.

However, since the prompter remains stationary in front of or above the podium and since the position for looking at the script is restricted, the speaker cannot move away from the podium. Besides, by taking into account the height of the speaker; the height, the orientation, and the angle of the half mirror need to be adjusted in advance at the venue of the speech.

As a method for resolving such issues, it is possible to think of a method in which the speaker wears a glasses-type terminal on which images of the script are presented. In this method, the speaker can visually confirm the script while freely moving around.

As presenting images to a user using a glasses-type terminal, various technologies are known. For example, a technology is known in which, from the presentation image projected onto a screen from a stationary projector, an area is detected that has been pointed by the speaker for a number of times equal to or greater than a predetermined number of times; and auxiliary images associated to that area (i.e., the speech script used in explaining that area) is displayed on a glasses-type terminal.

However, in a glasses-type terminal, there is a restriction on the size of the area of the field of view of the user within which images displayed on a compact display of the glasses-type terminal are viewable (i.e., there is a restriction on the screen size of the glasses-type terminal). Hence, if the images same as those used in a stationary projector are displayed on the compact display of the glasses-type terminal, then the script becomes illegible as compared to the stationary projector. Moreover, as a result of continuously reading the illegible script, the speaker suffers from eye fatigue, thereby making it difficult to use the glasses-type terminal during a long speech.

DETAILED DESCRIPTION

According to an embodiment, an image display system includes a first generator and a second generator. The first generator generates a first image which includes first text data representing at least a portion of text data and which is displayed by a first display device of stationary type. The second generator generates a second image which includes second text data representing at least a portion of the first text data and which is displayed by a second display device that is worn by a first user.

Various embodiments will be described below in detail with reference to the accompanying drawings.

First Embodiment

Figure 1:
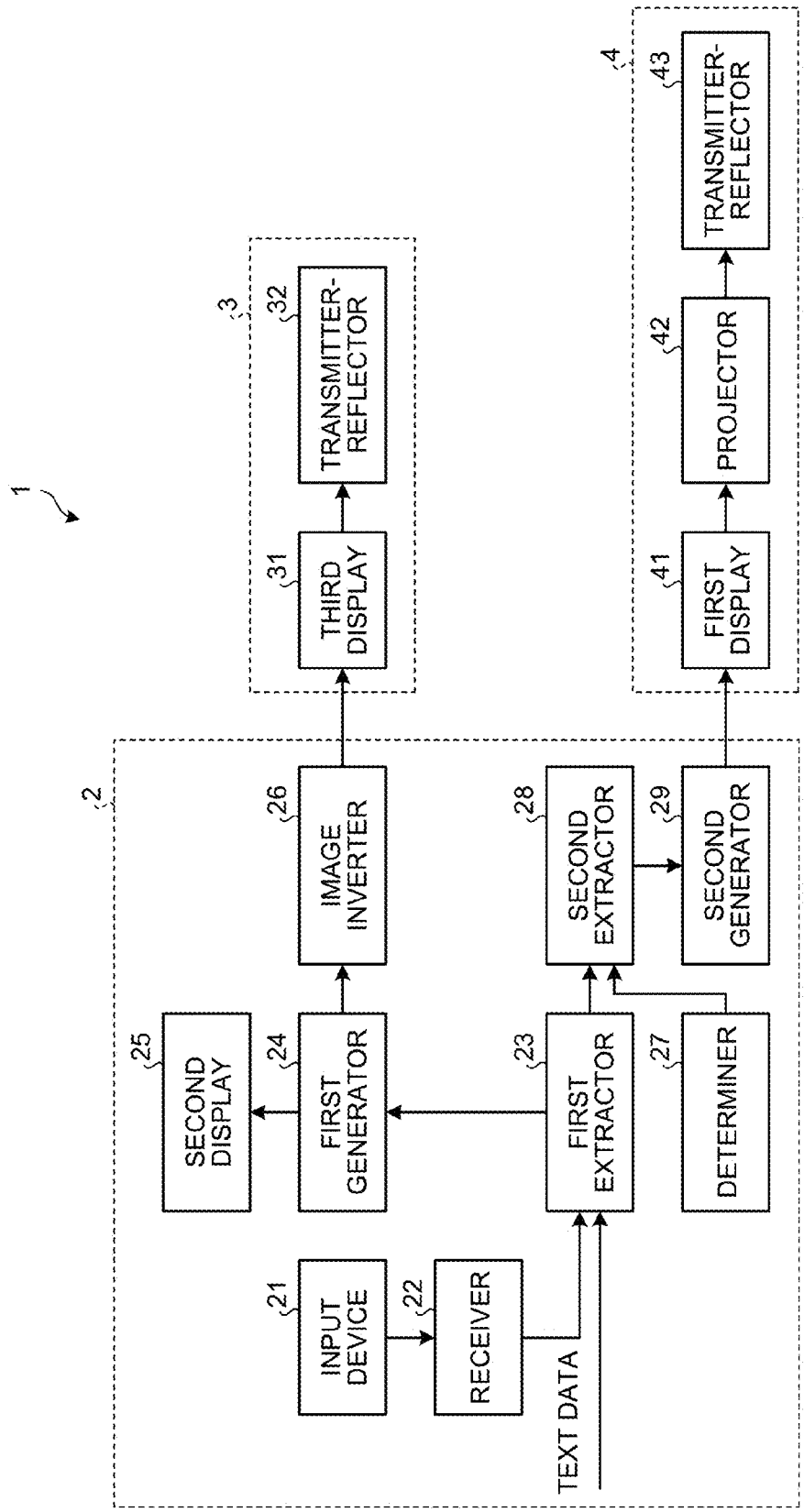
FIG. 1 is a diagram illustrating an exemplary configuration of an image display system according to a first embodiment.

FIG. 1 is a block diagram illustrating an exemplary overall configuration of an image display system 1 according to a first embodiment. As illustrated in FIG. 1, the image display system 1 includes an operating terminal 2, a stationary terminal 3, and a glasses-type terminal 4. The operating terminal 2 and the stationary terminal 3 can communicate with each other directly or indirectly via a wired connection or a wireless connection. Similarly, the operating terminal 2 and the glasses-type terminal 4 can communicate with each other directly or indirectly via a wired connection or a wireless connection. Regarding the method of communication between the operating terminal 2 and the stationary terminal 3, and regarding the method of communication between the operating terminal 2 and the glasses-type terminal 4; any arbitrary method of communication can be implemented.

The operating terminal 2 generates an image to be displayed in the stationary terminal 3 (in the following explanation, sometimes called a "first image") and an image to be displayed in the glasses-type terminal 4 (in the following explanation, sometimes called a "second image") in response to an operation performed by an operator (in the following explanation, sometimes called a "second user"). The operating terminal 2 is configured with, for example, a desktop PC, a laptop PC, a tablet, a smartphone, a cellular phone, a wrist-watch type terminal, or a necklace-type terminal. In this example, the operating terminal 2 can be considered to be a terminal that receives operations (such as a scrolling operation (described later)) for generating the first image and the second image.

As illustrated in FIG. 1, the operation terminal 2 includes an input device 21, a receiver 22, a first extractor 23, a first generator 24, a second display element 25, an image inverter 26, a determiner 27, a second extractor 28, and a second generator 29.

The input device 21 is an operating device used by a second user (an operator) for performing operations. For example, the input device 21 is configured with a mouse or a keyboard. The receiver 22 receives operations via the input device 21.

Figure 2:
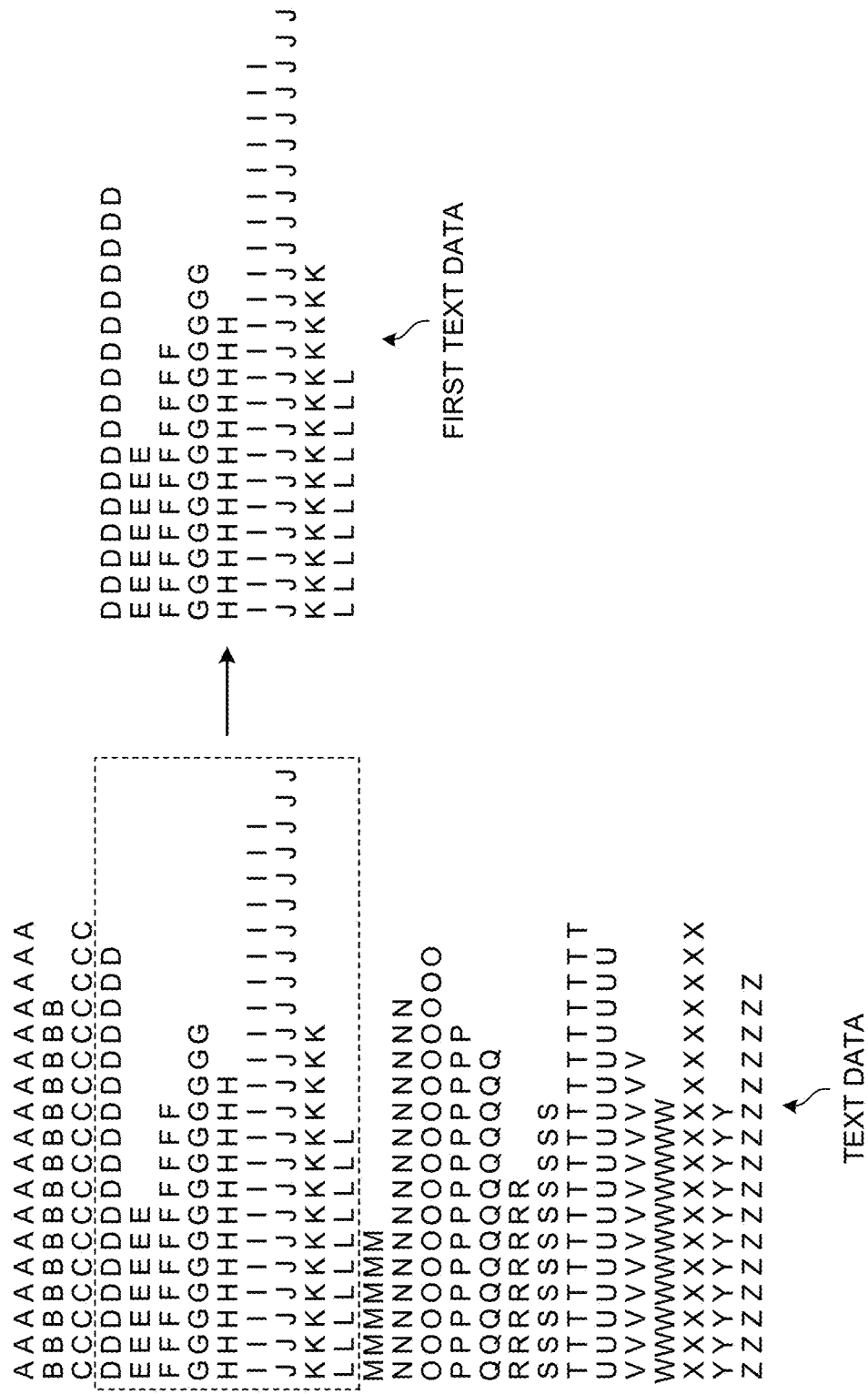
FIG. 2 is a diagram for explaining a method of extracting first text data according to the first embodiment.

The first extractor 23 extracts, from text data, first text data that represents at least a portion of the text data. In an example illustrated in FIG. 2, in the text data, the range enclosed by a dotted line represents the range to be extracted as the first text data. In this example, the text data represents text data of a script serving as the basis for a discourse, a speech, or a song to be performed by a speaker who is wearing the glasses-type terminal 4 (in the following explanation, sometimes called a "first user"). Herein, the explanation is given under the assumption that the text data is of the size that cannot be sufficiently displayed on the second display element 25. Meanwhile, the first extractor 23 can obtain the text data according to an arbitrary method. For example, the first extractor 23 can obtain the text data from an external device such as a server device, or can access a memory (not illustrated) in which the text data is stored in advance and obtain the text data.

In the first embodiment, in response to an operation performed by a second user, the first extractor 23 determines the range to be extracted as the first text data from the text data. For example, if the receiver 22 receives a scrolling operation for moving the text data from side to side or up and down with the aim of displaying, in the second display element 25, the portion that is not being sufficiently displayed in the second display element 25; then, as the range to be extracted as the first text data, the first extractor 23 can determine the range in the text data defined by the positions to which the text data is scrolled according to the operation (i.e., can determine the range displayable in the second display element 25). Meanwhile, regarding the operation for determining the range to be extracted as the first text data from the text data, an arbitrary operation can be performed not limited to the scrolling operation. (Alternatively, for example, a page turning operation can also be performed).

Alternatively, for example, the first extractor 23 determines the range to be extracted as the first text data from the text data according to the size of the characters displayed in the stationary terminal 3 (described later).

Figure 3:
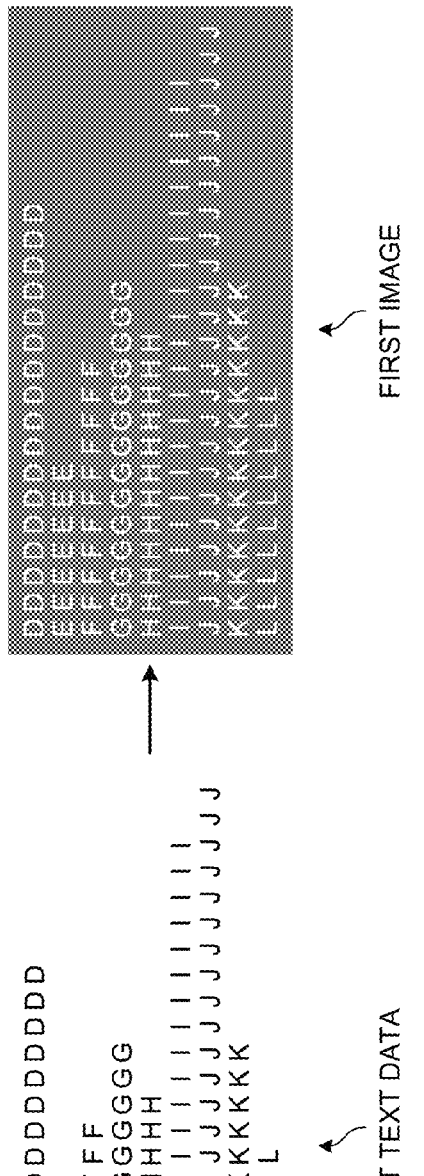
FIG. 3 is a diagram for explaining a method of generating a first image according to the first embodiment.

Given below is the explanation about the first generator 24 illustrated in FIG. 1. The first generator 24 generates a first image that includes the first text data, which represents at least a portion of the text data, and that is displayed in the stationary terminal 3. More particularly, the first generator 24 generates a first image by converting the first text data, which is extracted by the first extractor 23, into an image. In an example illustrated in FIG. 3, the first generator 24 converts the first text data, which is extracted by the first extractor 23, into an image; superimposes the post-conversion image on a background image; and generates a first image. Herein, an image including the first text data can be considered to indicate an image that includes the image obtained as a result of conversion of the first text data (i.e., the image equivalent to the first text data).

In a first image, the layout of the first text data (such as the number of lines, the number of columns, the line feed positions, the character gap, and the line spacing) is maintained. Meanwhile, in the example illustrated in FIG. 3, the foreground color (the character color) is white, and the background color is gray. However, the colors are not limited to this example. Moreover, for example, if the character color is specified in the text data, then the first image can be generated by reflecting the specified color in the image.

In this way, every time the first text data is extracted in response to an operation of a second user, the first generator 24 generates a first image that includes the extracted first text data. Then, the first generator 24 sends the first image to the second display element 25 and the image inverter 26.

Returning to the explanation with reference to FIG. 1, the second display element 25 is a display device that displays the first image generated by the first generator 24. The display device can be of arbitrary type, such as a liquid crystal display device or an organic electroluminescence (EL) display device. In the example illustrated in FIG. 1, the second user can perform an operation such as scrolling or page turning while checking the image being displayed on the second display element 25, and can switch between the first images.

The image inverter 26 illustrated in FIG. 1 generates a mirror image by mirror-reversing the first image generated by the first generator 24, and sends the mirror image to the stationary terminal 3. In this example, the stationary terminal 3 is equivalent to a prompter.

As illustrated in FIG. 1, the stationary terminal 3 includes a third display element 31 and a combiner 32. The third display element 31 is a display device that displays the mirror image sent by the image inverter 26, and is installed in front of or above a podium. Moreover, the third display element 31 is configured with, for example, a liquid crystal display device or an organic EL display device. The combiner 32 is configured with a stand-type half mirror that reflects a portion of the light which includes information about the mirror image and which is coming from the third display element 31, and guides the reflected light to the speaker. As a result of being reflected at the half mirror, the mirror image is flipped horizontally (i.e., the mirror image reverts to being the first image). Hence, the light that includes information about the first image is transmitted to the speaker. That enables the speaker to visually confirm the first image.

Meanwhile, for example, the stationary terminal 3 can be configured to not include the combiner 32. In that case, the image inverter 26 becomes redundant. If the image inverter 26 is necessary as in the case of the first embodiment, it can be installed independent of the operating terminal 2 and the stationary terminal 3.

Continuing with the explanation of the operating terminal 2, the determiner 27 illustrated in FIG. 1 determines the maximum number of characters displayable in the glasses-type terminal 4 based on the size of the characters (in the following explanation, sometimes simply called "character size") displayed in the glasses-type terminal 4 (described later) and based on the resolution (the number of pixels) of a first display element 41 included in the glasses-type terminal 4 (described later). More particularly, the determiner 27 refers to association information in which the maximum number of characters is associated to each combination (for each of a plurality of combinations) of the character size and the resolution of the first display element 41 (for example, refers to information in a table format), and determines the maximum number of characters.

In the first embodiment, the determiner 27 obtains the field of view defined in the hardware specifications of the glasses-type terminal 4 (i.e., of the field of view of the first user wearing the glasses-type terminal 4, the angular range within which the image displayed in the first display element 41 is visible); and determines a suitable character size (a legible character size for the first user) according to the obtained field of view. Then, the determiner 27 refers to the association information, and can determine the maximum number of characters corresponding to the combination of the character size that is determined and the resolution of the first display element 41.

Herein, the determiner 27 can obtain information about the field of view of the glasses-type terminal 4 either from the glasses-type terminal 4 or from an external device (such as a server device). Similarly, the determiner 27 can obtain information about the resolution of the first display element 41 of the glasses-type terminal 4 either from the glasses-type terminal 4 or from an external device. Meanwhile, the association information can be stored at an arbitrary location. For example, the association information can be stored in the operating terminal 2, or can be stored in an external device.

Regarding the character size, the user (in this example, the second user) can arbitrarily specify the character size. For example, the determiner 27 can determine the character size according to an operation received by the receiver 22. Then, the determiner 27 can refer to the association information, and can determine the maximum number of characters corresponding to the combination of the character size that is determined and the resolution of the first display element 41.

Given below is the explanation about the second extractor 28 illustrated in FIG. 1. The second extractor 28 extracts, from the first text data extracted by the first extractor 23, characters equal or smaller in number than the maximum number of characters determined by the determiner 27; and treats them as second text data that represents at least a portion of the first text data. In this example, the second text data represents a portion of the first text data; and the first text data has a greater number of characters than the second text data. In an example illustrated in FIG. 4, in the first text data, the range enclosed by a dotted line represents the range to be extracted as the second text data. Herein, the range to be extracted as the second text data is defined by the maximum number of characters. For example, if the maximum number of characters is 52 characters (for example, a layout of 13 columns×4 lines at the time of displaying on the glasses-type terminal 4); the second extractor 28 extracts, from the first text data, characters equal or smaller in number than the 52 characters as the second text data. It is often the case that the first user is looking in the neighborhood of the middle portion of a plurality of lines of text (equivalent to the first text data) displayed in the stationary terminal 3 that functions as a prompter (herein, the second user performs operations such as scrolling and page turning in such a way that the first user looks in the neighborhood of the middle portion). Hence, it is desirable that the characters equal to or smaller in number than the 52 characters are extracted from a range including the neighborhood of the middle portion of the first text data and including a predetermined number of lines around the middle portion).

Figure 4:
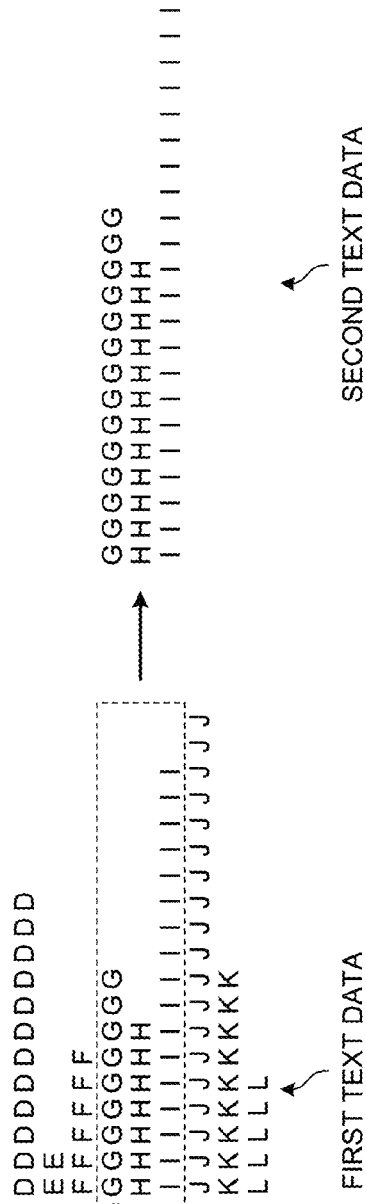
FIG. 4 is a diagram for explaining a method of extracting second text data according to the first embodiment.

In the example illustrated in FIG. 4, in the middle portion of the first text data, 12 characters from the line of "H", 14 characters from the line of "G" present before the line of "H", and 22 characters from the line of "I" present after the line of "H" are extracted as the second text data. Thus, a total of 48 characters are extracted as the second text data. However, that is not the only possible case. That is, of the first text data, the range of the second text data can be set in an arbitrary manner. For example, in the first text data, from a range including a predetermined number of lines in order starting from the topmost line in the downward direction, the characters equal or smaller in number than the maximum number of characters can be extracted. Alternatively, in the first text data, from a range including a predetermined number of lines in order starting from the bottommost line in the upward direction, the characters equal or smaller in number than the maximum number of characters can be extracted.

Figure 5:
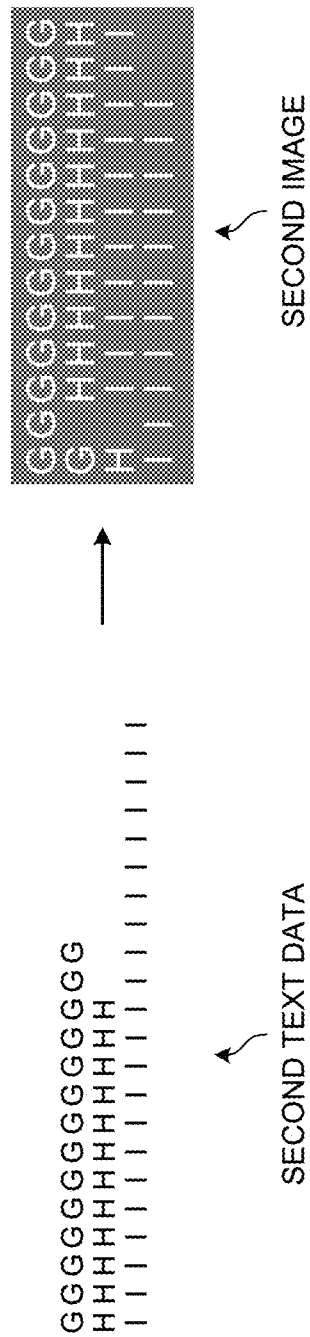
FIG. 5 is a diagram for explaining a method of generating a second image according to the first embodiment.

Given below is the explanation of the second generator 29 illustrated in FIG. 1. The second generator 29 generates a second image that includes the second text data, which represents at least a portion of the first text data, and that is displayed in the glasses-type terminal 4 worn by the first user. More particularly, as illustrated in FIG. 5, the second generator 29 generates a second image by converting the second text data, which is extracted by the second extractor 28, into an image. In the first embodiment, the second generator 29 refers to layout information in which a layout is associated to each of a plurality of types of the maximum number of characters; identifies the layout corresponding to the maximum number of characters determined by the determiner 27; and changes the layout of the second text data, which is extracted by the second extractor 28, to the identified layout. Then, the second generator 29 generates a second image by converting the second text data after layout changing into an image, and sends the second image to the glasses-type terminal 4.

In the example illustrated in FIG. 5, in the layout information, the layout of "13 columns×4 lines" corresponds to the maximum number of characters of 52. In this case, firstly, the second generator 29 refers to the layout information, and identifies the layout of "13 columns×4 lines" corresponding to the maximum number of characters of 52 determined by the determiner 27. Then, the second generator 29 changes the layout (in the example illustrated in FIG. 5, "22 columns×3 lines") of the second text data, which is extracted by the second extractor 28, to the layout of "13 columns×4 lines" corresponding to the maximum number of characters of 52.

In the example illustrated in FIG. 5, of the 14 characters of "G", 13 characters are placed in the first line and the remaining one character is placed at the position corresponding to the first character in the second line. Moreover, the position corresponding to the second character in the second line is left blank. At the positions corresponding to the third character to the 13-th character in the second line, 11 of the 12 characters of "H" are placed in order. Moreover, the remaining one character out of the 12 characters of "H" is placed at the position corresponding to the first character in the third line. Furthermore, the position corresponding to the second character in the third line is left blank. At the positions corresponding to the third character to the 13-th character in the second line, 11 of the 22 characters of "I" are placed in order. The remaining 11 characters out of the 22 characters of "I" are placed in the fourth line.

The second generator 29 converts the second text data, which has been subjected to a layout change in the manner described above, into an image; superimposes the post-conversion image on a background image; and generates a second image. Herein, an image including the second text data can be considered to indicate an image that includes the image obtained as a result of conversion of the second text data (i.e., the image equivalent to the second text data). Meanwhile, in the example illustrated in FIG. 5, the foreground color (the character color) is white, and the background color is gray. However, the colors are not limited to this example. Moreover, for example, if the character color is specified in the text data, then the second image can be generated by reflecting the specified color in the image.

Meanwhile, the layout information can be stored at an arbitrary location. For example, the layout information can be stored in the operating terminal 2, or can be stored in an external server.

Figure 6:
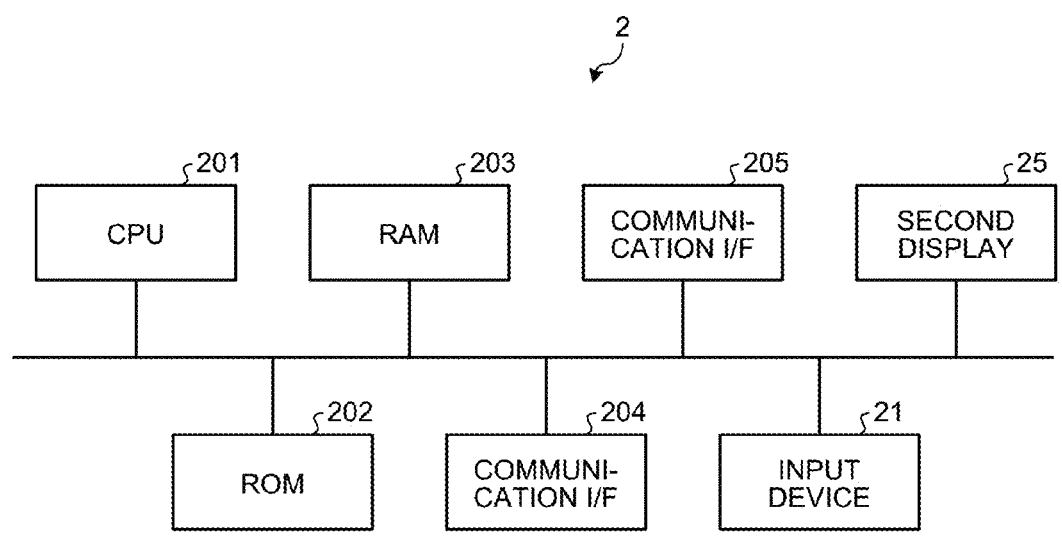
FIG. 6 is a diagram illustrating an exemplary hardware configuration of an operating terminal according to the first embodiment.

FIG. 6 is a diagram illustrating an exemplary hardware configuration of the operating terminal 2. As illustrated in FIG. 6, the operating terminal 2 includes a central processing unit (CPU) 201, a read only memory (ROM) 202, a random access memory (RAM) 203, a communication interface (I/F) 204 for performing communication with the stationary terminal 3, a communication I/F 205 for performing communication with the glasses-type terminal 4, the input device 21, and the second display element 25. In the operating terminal 2, the functions of the abovementioned constituent elements (i.e., the receiver 22, the first extractor 23, the first generator 24, the image inverter 26, the determiner 27, the second extractor 28, and the second generator 29) are implemented when the CPU 201 reads computer programs stored in the ROM 202, loads them in the RAM 203, and executes them. However, that is not the only possible case. Alternatively, for example, at least some of the functions of the operating terminal 2 can be implemented using dedicated hardware circuitry (such as a semiconductor integrated circuit).

Meanwhile, the computer programs executed in the operating terminal 2 can be saved as downloadable files on a computer connected to a network such as the Internet or can be made available for distribution through a network such as the Internet. Alternatively, the computer programs executed in the operating terminal 2 can be stored in advance in a nonvolatile recording medium such as a ROM.

Given below is the explanation of the glasses-type terminal 4. Herein, the glasses-type terminal 4 is a display device that is worn by a first user in the head region; and that is capable of projecting an image, which is displayed on a compact display thereof, onto an optical system in front of the first user and thus presenting the projected image to the first user. The glasses-type terminal 4 is broadly divided into two types, namely, a video see-through type and an optical see-through type. However, herein, the explanation is limited to an optical see-through type terminal. Although an optical see-through type terminal is often compact in size, it may also be of a large size. Besides, the glasses-type terminal 4 can be of a monocular type in which information is displayed only to one eye, or can be of a binocular type in which information is displayed to both eyes. Herein, any one of those two types may be used.

Figure 7:
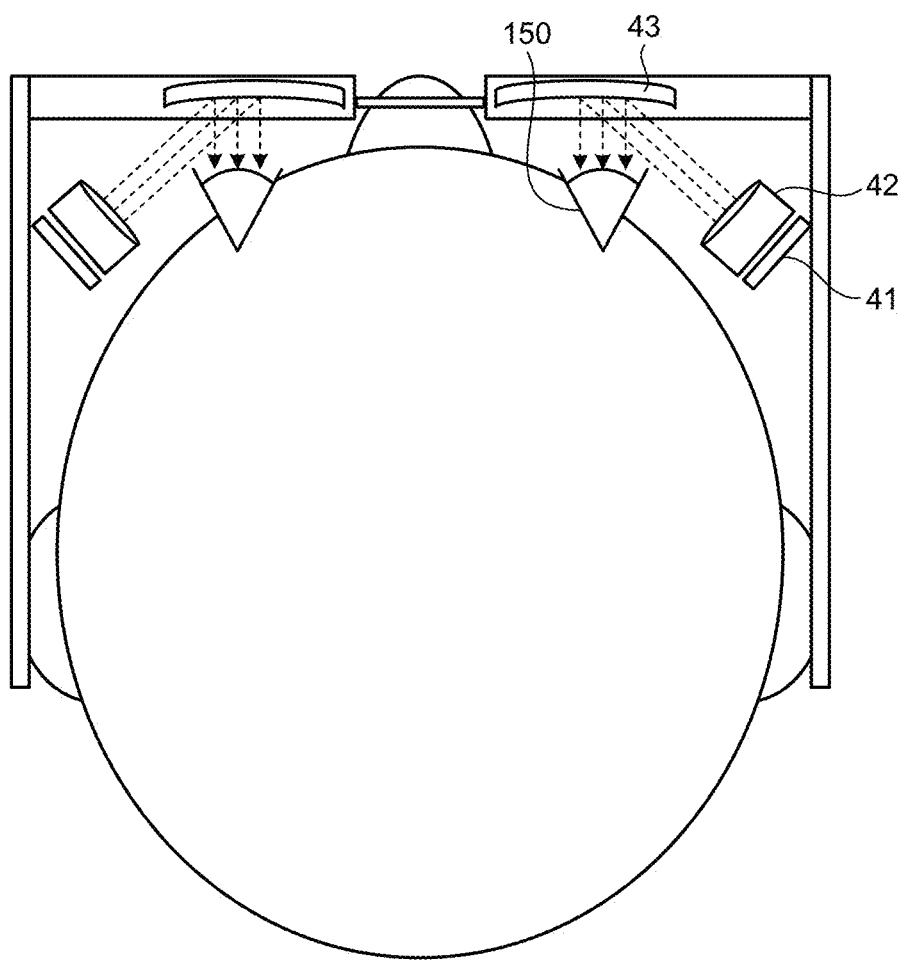
FIG. 7 is a diagram illustrating an example of specific positioning of each constituent element of a glasses-type terminal according to the first embodiment.

FIG. 7 is a schematic diagram illustrating an example of specific positioning of each constituent element of the glasses-type terminal 4. In the example illustrated in FIG. 7, the glasses-type terminal 4 is of a binocular type. However, that is not the only possible case. As illustrated in FIGS. 1 and 7, the glasses-type terminal 4 includes the first display element 41, a projector 42, and a combiner 43.

The first display element 41 is a display device that displays a second image, and is configured with, for example, a liquid crystal display device or an organic EL display device. The light emitted from each pixel of the first display element 41 falls on the projector 42.

The projector 42 varies the focal length and the optical path of the light emitted from each pixel of the first display element 41, and projects the light toward the combiner 43. In this example, the projector 42 has the function of projecting light that includes information about the second image and that is emitted from the first display element 41. The projector 42 is configured with optical elements such as a plurality of lenses, a prism, and a mirror. These optical elements need not be aligned in a linear manner.

The combiner 43 passes external light coming from the outside world that is on the opposite side of eyes 150 of the first user across the combiner 43; while reflects the light projected by the projector 42. The light reflected by the combiner 43 is guided to the eyes 150 of the first user thereby enabling the first user to visually confirm the second image. Herein, the combiner 43 is configured with, for example, a half mirror.

As described above, in the first embodiment, a first image is generated that includes the first text data representing at least a portion of the text data, and the first image is displayed in the stationary terminal 3. Moreover, a second image is generated that includes the second text data representing at least a portion of the first text data, and the second image is displayed in the glasses-type terminal 4. More particularly, in the first embodiment, based on the character size (a recommended character size) determined according to the field of view of the glasses-type terminal 4 and based on the resolution of the first display element 41 included in the glasses-type terminal 4, the maximum number of characters displayable in the glasses-type terminal 4 is determined. Then, characters equal or smaller in number than the maximum number of characters are extracted from the first text data, and are treated as the second text data. Subsequently, a second image is generated that includes the second text data, and is displayed in the glasses-type terminal 4. As a result, a legible image of the script can be presented to the first user who is wearing the glasses-type terminal 4, thereby enabling achieving reduction in the eye fatigue of the first user. Hence, the glasses-type terminal 4 according to the first embodiment can be used during a long speech too.

Moreover, as described above, in the first embodiment, the layout information, in which a layout is associated to each of a plurality of types of the maximum number of characters is referred to, and a layout is identified that corresponds to the maximum number of characters determined based on the character size and the resolution of the first display element 41. Then, the layout of the second text data, which is extracted from the first text data, is changed to the identified layout; and a second image including the second text data after layout changing is generated and displayed in the glasses-type terminal 4. Thus, the image of the script that has been changed to have a suitable layout according to the maximum number of characters can be presented to the first user who is wearing the glasses-type terminal 4. Therefore, it becomes possible to present a legible image of the script to the first user.

Moreover, in the first embodiment, even in the case in which the first user who is wearing the glasses-type terminal 4 moves into a range from which the image of the script displayed on the stationary terminal 3 functioning as a prompter is not viewable, he or she can give the discourse while looking at the image of the script presented in the glasses-type terminal 4. That is, the first user, who is the speaker, can give the discourse while freely moving around.

In this way, according to the first embodiment, it not only becomes possible not to restrict the movements of the speaker but also becomes possible to present legible images of the script to the speaker.

First Modification Example of First Embodiment

For example, the layout of the second text data, which is extracted from the first text data, may not be changed to the layout corresponding to the maximum number of, characters.

Moreover, for example, the second extractor 28 may not be uses. Instead, the second generator 29 can clip, from the first image generated by the first generator 24, an image of the range according to the field of view of the glasses-type terminal 4 (i.e., the range within which the glasses-type terminal 4 can display an image of high legibility) and can treat the clipped image as a second image. In this case, a text image included in the clipped image, which is clipped from the first image, becomes equivalent to the second text data; and the clipped image can be considered to be the image including the second text data. In essence, it serves the purpose as long as the second generator 29 has the function of generating a second image that includes the second text data, which represents at least a portion of the first text data, and that is displayed in the glasses-type terminal 4 worn by the first user in the head region.

Second Modification Example of First Embodiment

In a second image, the foreground color (the character color) or the background color can be changed in an arbitrary manner. For example, the second generator 29 can set the character color or the background color in a second image in response to an operation received by the receiver 22.

Alternatively, for example, the second generator 29 can determine the background color in the second image based on an image (hereinafter, called a "captured image") obtained by capturing the area in the line of sight of the first user who is wearing the glasses-type terminal 4 (i.e., capturing the area equivalent to the field of view of the first user). In this case, in the glasses-type terminal 4, an imaging device (such as a visible light camera) is disposed for capturing the area in the line of sight of the first user who is wearing the glasses-type terminal 4. The second generator 29 obtains the captured image obtained by the imaging device. Then, the color of the same spectrum of a color included in the captured image (for example, the most common color in the captured image) can be set as the background color in the second image. Alternatively, the color positioned in the color circle on the opposite side of a color included in the captured image (i.e., the complementary color of a color included in the captured image) can be set as the background color in the second image.

Third Modification Example of First Embodiment

For example, the glasses-type terminal 4 can be configured to have the function of generating a second image. In an example illustrated in FIG. 8, the determiner 27, the second extractor 28, and the second generator 29 are disposed not in the operating terminal 2 but in the glasses-type terminal 4. Besides, the glasses-type terminal 4 further includes an obtainer 50 that obtains the first text data.

Figure 8:
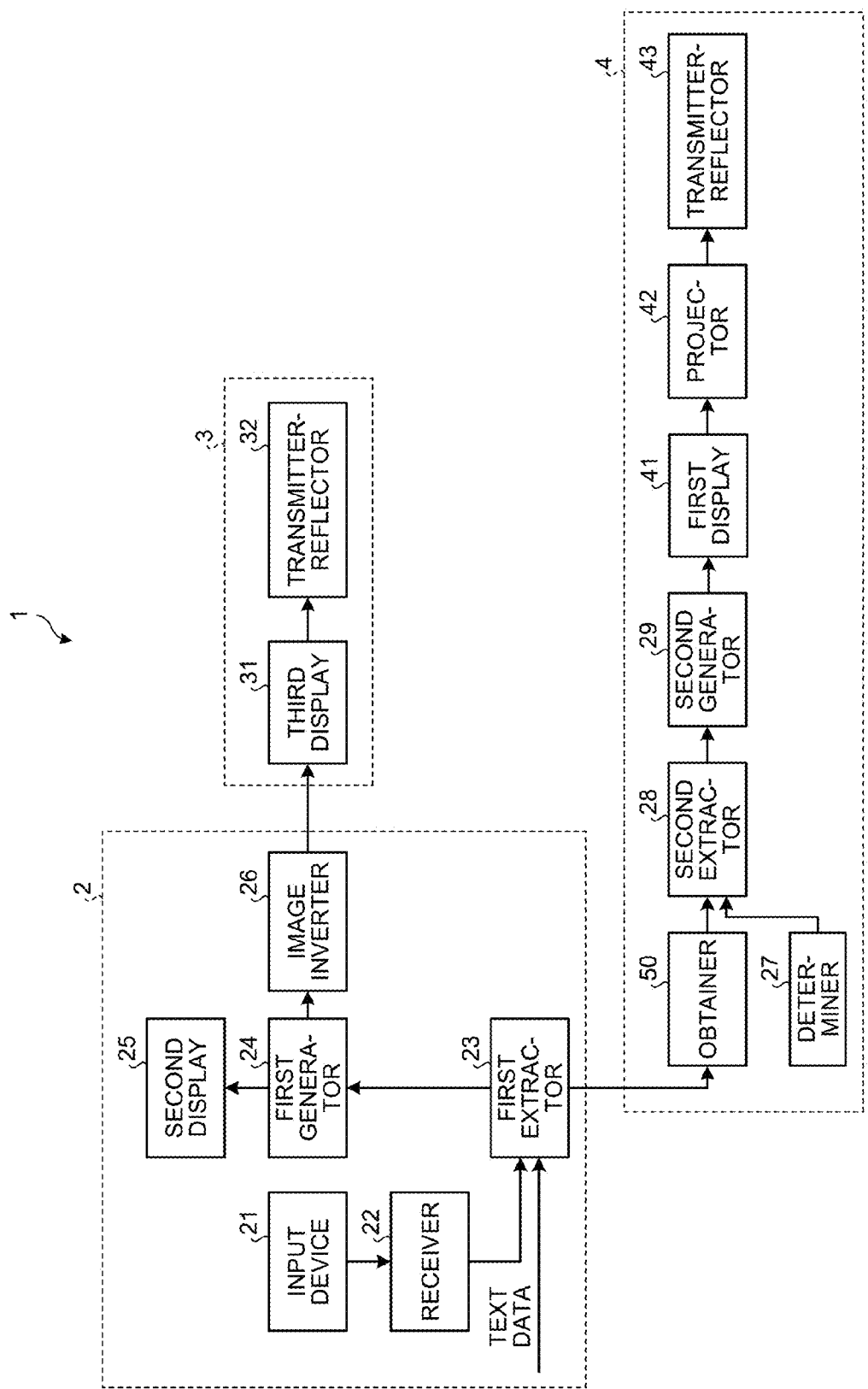
FIG. 8 is a diagram illustrating an exemplary configuration of the image display system according to a modification example.

In the example illustrated in FIG. 8, the obtainer 50 obtains the first text data from the first extractor 23. However, that is not the only possible case. Alternatively, for example, the obtainer 50 obtains operation information indicating the operation received by the receiver 22 as well as obtains the text data; and then extracts the first text data based on the operation information and the text data. More particularly, according to the operation information, the obtainer 50 can determine the range to be extracted as the first text data from the text data. In essence, it serves the purpose as long as the obtainer 50 has the function of obtaining the first text data included in a first image displayed in the stationary terminal 3, which is different from the glasses-type terminal 4. Aside from that, the configuration is identical to the first embodiment.

Figure 9:
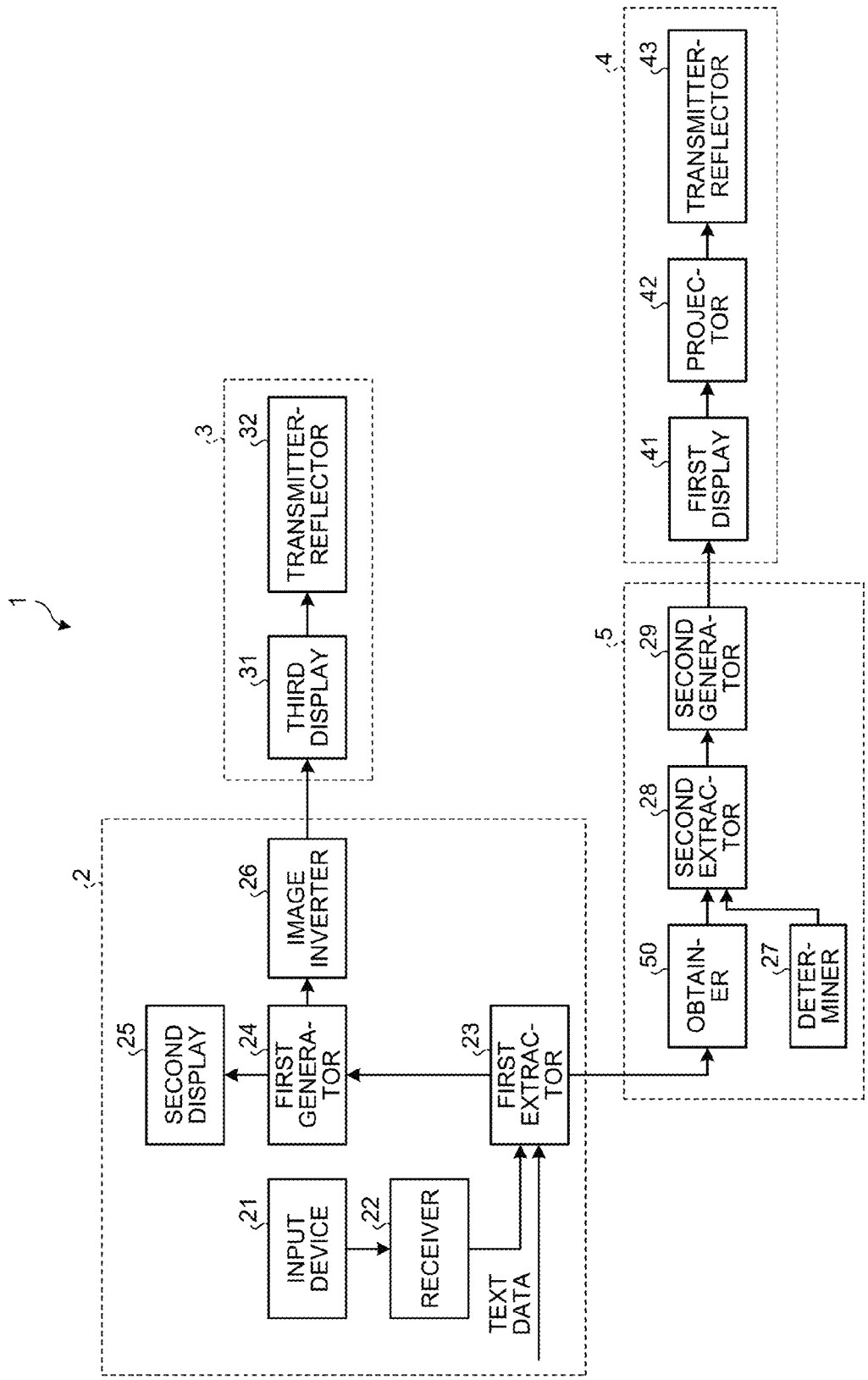
FIG. 9 is a diagram illustrating an exemplary configuration of the image display system according to a modification example.

Still alternatively, for example, a separate terminal 5 can be disposed in between the operating terminal 2 and the glasses-type terminal 4 and can be configured to have the function of generating a second image. Herein, the terminal 5 can be a smartphone. In an example illustrated in FIG. 9, the terminal 5 that is disposed in between the operating terminal 2 and the glasses-type terminal 4 includes the obtainer 50, the determiner 27, the second extractor 28, and the second generator 29. Aside from that, the configuration is identical to the first embodiment.

In essence, it serves the purpose as long as the image display system according to the first embodiment includes at least the first generator 24 and the second generator 29. A device in which the second generator 29 is to be disposed can be changed in an arbitrary manner. For example, the second generator 29 may be disposed in the operating terminal 2, or may be disposed in the glasses-type terminal 4, or may be disposed in the terminal 5 that is disposed in between the operating terminal 2 and the glasses-type terminal 4.

Fourth Modification Example of First Embodiment

In the first embodiment, the explanation is given for a case in which a single operating terminal 2 and a single stationary terminal 3, which functions as a prompter, are used. However, that is not the only possible case. Alternatively, there can be a plurality of operating terminals 2 and a plurality of stationary terminals 3.

Second Embodiment

Figure 10:
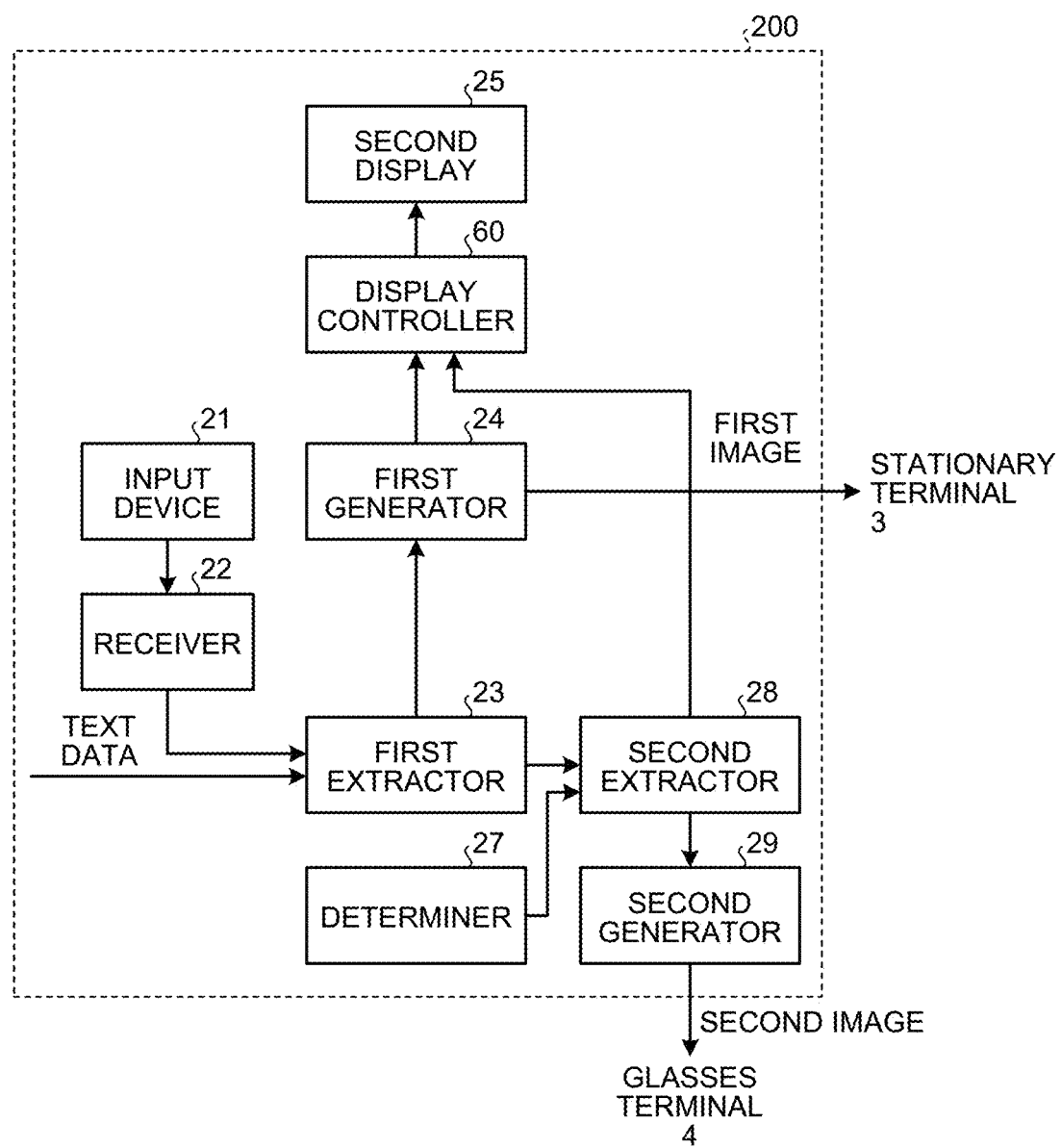
FIG. 10 is a diagram illustrating an exemplary configuration of an operating terminal according to a second embodiment.

Given below is the explanation of a second embodiment. FIG. 10 is a diagram illustrating an exemplary configuration of an operating terminal 200 according to the second embodiment. As illustrated in FIG. 10, the operating terminal 200 differs from the first embodiment in the way that a display controller 60 is additionally disposed. Aside from that, the configuration is identical to the first embodiment.

Figure 11A:
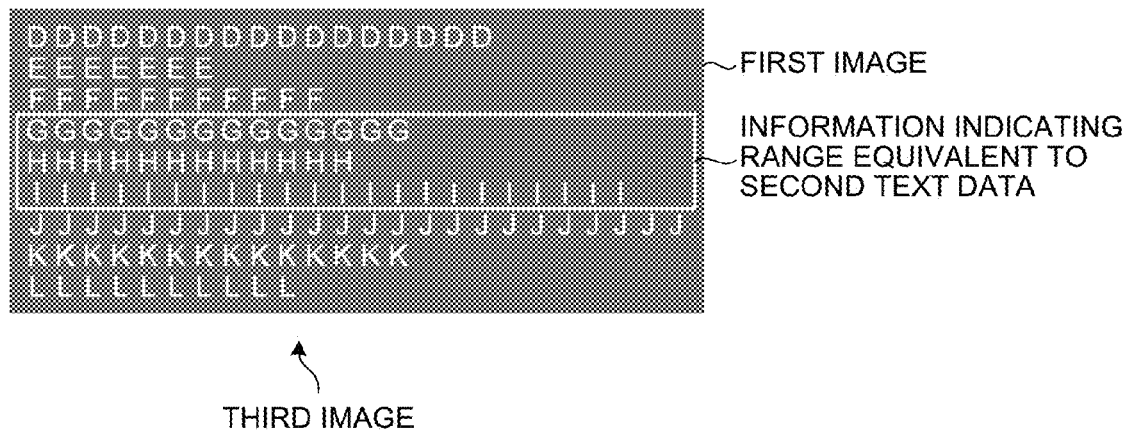
FIGS. 11A and 11B are diagrams for explaining a method of generating a third image and a fourth image according to the second embodiment.

As illustrated in FIG. 11A, the display controller 60 performs control to display, on the second display element 25, a third image formed by superimposing, on a first image, information indicating the range equivalent to the second text data in the first image. As a result, a second user (an operator) who operates the operating terminal 200 becomes able to perform operations such as scrolling or page turning while having the knowledge of the display contents of the stationary terminal 3, which functions as a prompter, as well as the knowledge of the display contents of the glasses-type terminal 4.

First Modification Example of Second Embodiment

Figure 11B:
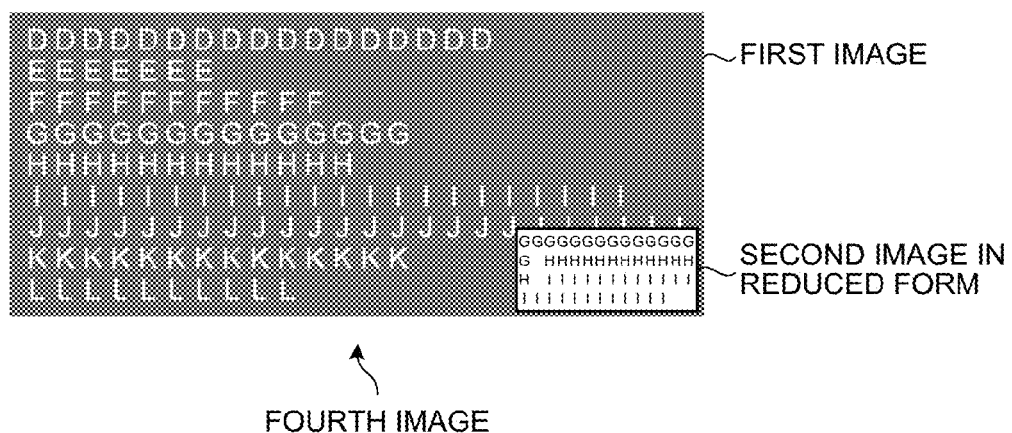

For example, as illustrated in FIG. 11B, control can be performed to display, on the second display element 25, a fourth image formed by superimposing a reduced second image on the first image. As a result, a second user (an operator) who operates the operating terminal 200 becomes able to perform operations such as scrolling or page turning while having the knowledge of the display contents of the stationary terminal 3, which functions as a prompter, as well as the knowledge of the display contents of the glasses-type terminal 4 (the appearance including the layout).

Second Modification Example of Second Embodiment

For example, the stationary terminal 3, which functions as a prompter, can be configured to display a third image or a fourth image. In this case too, it is possible to think that the stationary terminal 3 displays a first image that includes the first text data representing at least a portion of the text data.

Figure 12:
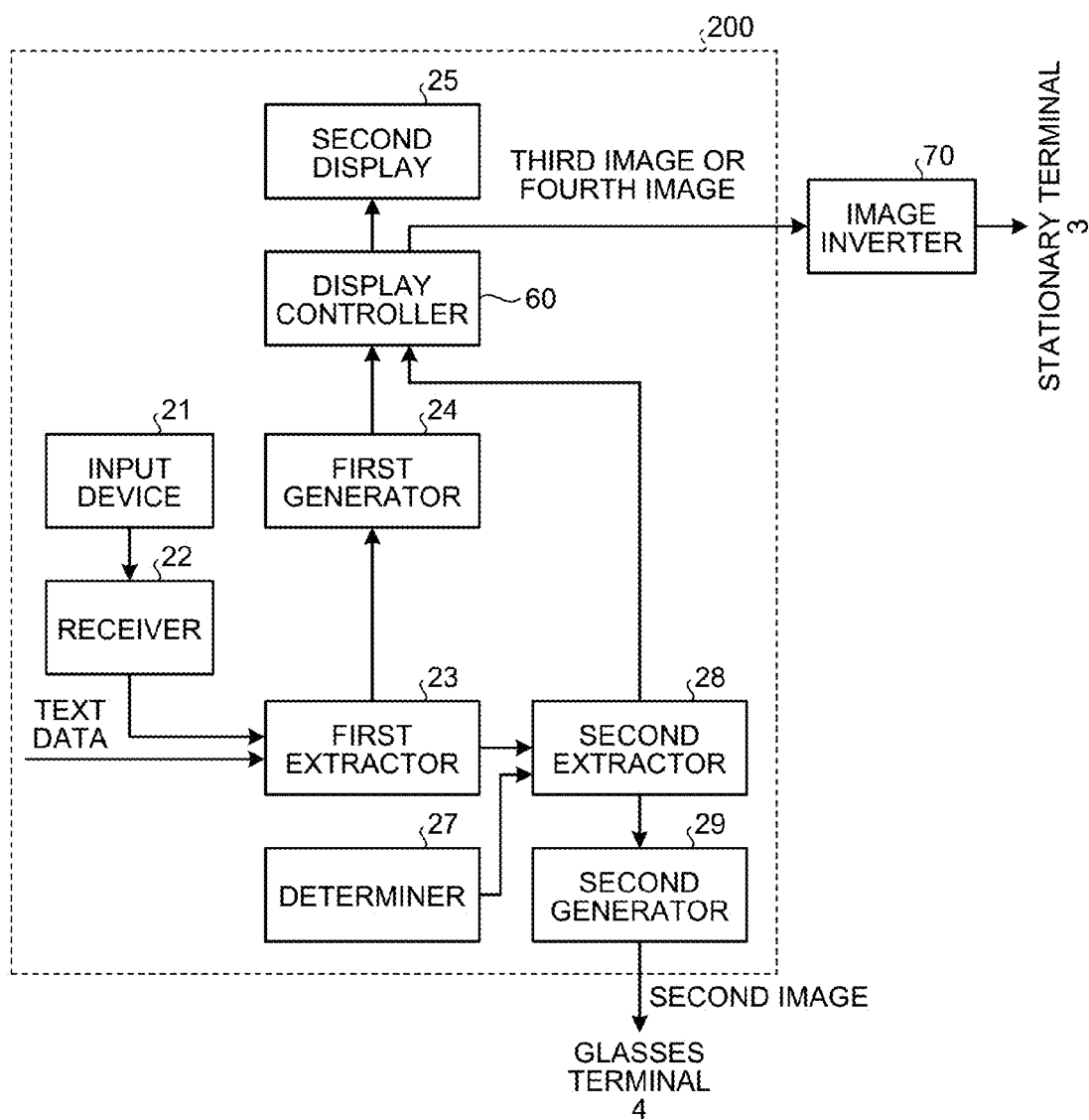
FIG. 12 is a diagram illustrating an exemplary configuration of the operating terminal according to a modification example.

In an example illustrated in FIG. 12, the display controller 60 sends a third image or a fourth image to an image inverter 70. Herein, the image inverter 70 has the same function as the image inverter 26 according to the first embodiment. Thus, the image inverter 70 generates a mirror image by mirror-reversing a third image or a fourth image, and sends the mirror image to the stationary terminal 3. In an identical manner to the first embodiment, the third display element 31 of the stationary terminal 3 displays the mirror image sent by the image inverter 70; and the combiner 32 of the stationary terminal 3 reflects a portion of the light that includes information about the mirror image and that is coming from the third display element 31, and guides the reflected light to the speaker. As a result of being reflected at the half mirror, the mirror image is flipped horizontally. Hence, the light that includes information about the third image or the fourth image is transmitted to the speaker.

Meanwhile, in the example illustrated in FIG. 12, the image inverter 70 is disposed independent of the operating terminal 200 and the stationary terminal 3. However, that is not the only possible case. Alternatively, for example, the image inverter 70 can be either disposed in the operating terminal 200 or disposed in the stationary terminal 3.

Moreover, the embodiments and the modification examples described above can be combined in an arbitrary manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image display system comprising:
    a first generator to generate a first image which includes first text data representing at least a portion of text data and which is displayed by a first display device of stationary type; and
    a second generator to generate a second image which includes second text data representing at least a portion of the first text data and which is displayed by a second display device to be worn by a first user; and
    a display controller to perform control to display, on a display element included in a third display device which receives an operation for generating the first image and the second image, a third image which is formed by superimposing, on the first image, information indicating a range equivalent to the second text data in the first image.

2. The system according to claim 1, further comprising:
    a first extractor to extract the first text data from the text data;
    a determiner to determine the maximum number of characters displayable in the second display device based on character size displayed by the second display device and resolution of the second display device; and
    a second extractor to extract the second text data by extracting characters equal or smaller in number than the maximum number of characters from the first text data.

3. The system according to claim 2, wherein the determiner determines the maximum number of characters using association information in which the maximum number of characters is associated to each combination of the character size and the resolution of the second display device.

4. The system according to claim 3, wherein the determiner determines the character size according to field of view of the second display device, and determines the maximum number of characters corresponding to a combination of the determined character size and the resolution of the second display device.

5. The system according to claim 2, wherein
    the first generator generates the first image by converting the first text data, which is extracted by the first extractor, into an image, and
    the second generator generates the second image by converting the second text data, which is extracted by the second extractor, into an image.

6. The system according to claim 2, wherein the second generator
    refers to layout information in which a layout is associated to each of a plurality of types of the maximum number of characters,
    identifies the layout corresponding to the maximum number of characters determined by the determiner, and
    changes the layout of the second text data, which is extracted by the second extractor, to the identified layout.

7. The system according to claim 6, wherein the second generator generates the second image by converting the second text data, which has been subjected to change in the layout, into an image.

8. The system according to claim 2, wherein, in response to an operation performed by a second user, the first extractor determines a range to be extracted as the first text data from the text data.

9. The system according to claim 2, wherein, according to character size displayed by the first display device, the first extractor determines a range to be extracted as the first text data from the text data.

10. The system according to claim 1, wherein the second display device includes
   a second display element to display the second image,
   a projector to project light which is emitted from the second display element and which includes information about the second image, and a combiner to pass external light coming from outside world but reflect light projected by the projector.

11. The system according to claim 1, wherein the first text data has a greater number of characters than the second text data.

12. The system according to claim 1, wherein the display controller further performs control to display, on the display element, a fourth image which is formed by superimposing a reduced form of the second image on the first image.

13. An image processing method comprising:
   generating a first image which includes first text data representing at least a portion of text data and which is displayed in a first display device of stationary type; and
   generating a second image which includes second text data representing at least a portion of the first text data and which is displayed on a second display device that is worn by a user; and
   displaying, on a display element included in a third display device which receives an operation for generating the first image and the second image, a third image which is formed by superimposing, on the first image, information indicating a range equivalent to the second text data in the first image.

14. The method according to claim 13, wherein
the third image is an image that is formed by superimposing the second image in a reduced form on a first image that includes the first text data.

15. An image display system comprising:
a first display device of stationary type to display a first image that includes first text data representing at least a portion of text data;
a second display device to be worn by a first user and to display a second image that includes second text data representing at least a portion of the first text data; and
a display controller to perform control to display, on a display element included in a third display device which receives an operation for generating the first image and the second image, a third image which is formed by superimposing, on the first image, information indicating a range equivalent to the second text data in the first image, the third image including a first area and a second area, wherein
the first area includes the first text data; and
the second area includes the second text data in a reduced form.

* * * * *